Feb. 11, 1936.  J. VON ISSENDORFF  2,030,127
GRID CONTROLLED ELECTRIC VACUUM DISCHARGE APPARATUS
Filed April 1, 1933
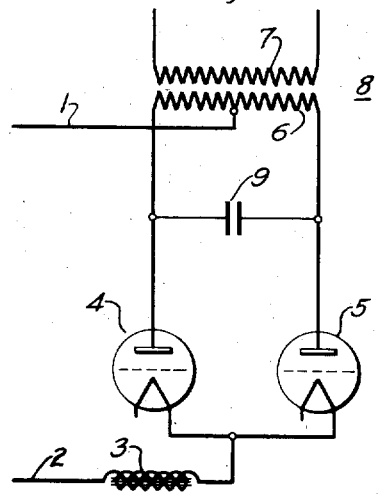
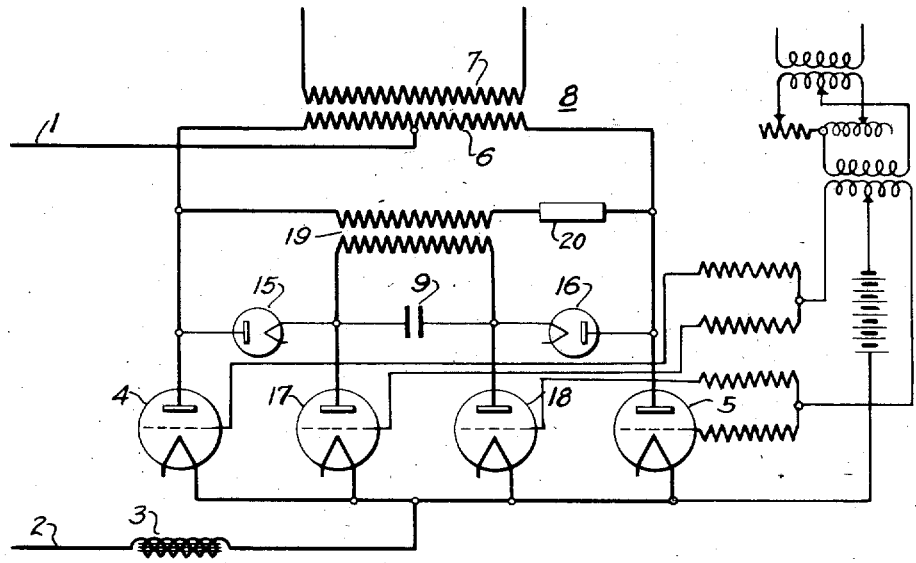
WITNESSES:
INVENTOR
Jürgen von Issendorff
BY
ATTORNEY Patented Feb. 11, 1936

2,030,127

UNITED STATES PATENT OFFICE 2,030,127

GRID-CONTROLLED ELECTRIC VACUUM DISCHARGE APPARATUS

Jürgen von Issendorff, Berlin-Siemensstadt, Germany, assignor to Westinghouse Electric & Manufacturing Company, East Pittsburgh, Pa., a corporation of Pennsylvania Application April 1, 1933, Serial No. 663,938
In Germany April 6, 1932

5 Claims. (Cl. 175—363)

My invention relates to grid-controlled electric vacuum discharge apparatus for the statical conversion of electrical power into alternating current.

In the fundamental connection for the production of alternating current, particularly of high frequency, from direct current by means of gas- or vapor-filled grid-controlled electric discharge device a condenser is inserted which is of particular importance for the operation of the apparatus. The main object of this condenser is to provide for a periodical extinction of the operating discharge in the valves by means of instantaneous absorption of the discharge current, the valve under consideration being blocked each time by a negative grid potential. The condenser is discharged during an extinction and is charged thereafter in opposite direction so that the condenser possesses the right polarity for extinguishing the succeeding valve or anode arc. Another object of the condenser is to supply wattless current to the transformer whereby the wave form of the supplied alternating current approaches the sine shape. The latter object of the condenser is, however, of less importance than the first-named, since the apparatus may readily supply either leading or lagging wattless current to the alternating current circuit, i. e., energy to capacitive or inductive consuming devices.

It is a fundamental characteristic of this system that it will permit the occurrence of tripping or unbalanced oscillations, which can change into harmonic oscillations in only special cases. Unbalanced and non-uniform oscillations will be present if the A. C. energy translating device comprises mainly inductive elements.

If the A. C. circuit contains in addition a sine shaped E. M. F., which may be produced by a synchronous generator, then this E. M F. will be impressed on the transformer and on the condenser. We may hereinafter term this condenser a commutating condenser. Of course the system will lose the property of generating independent tripping oscillations, and in connection therewith also the capacity of delivering wattless currents into the A. C. circuit. The quenching condenser alone has the capacity to do this, but only to a limited extent which is in general insufficient. The rest of the wattless currents would then have to be provided by the synchronous generator which would then operate as a phase shifting device, so that it could deliver a smaller amount of real energy.

But even if there is no independent alternating current E. M. F. in the circuit being energized, it will be preferable in many cases to be able to completely control the quenching process as for instance to increase the stability of the oscillations. A cessation of these oscillations would generally result in a short circuit of the D. C. source.

According to the present invention the above mentioned drawbacks are overcome in that the charging currents for the commuating condenser energized at the frequency of the alternating current, are conducted through additional valves which are controlled in part or in whole and are affected thereby.

Fig. 1 is a schematic illustration of a valve type converter having a capacitor for commutating the valves.

Fig. 2 is a similar view showing an improved control system according to my invention.

In Fig. 1 is illustrated an embodiment showing how the electric discharge valves for the production of alternating current from direct current have been hitherto connected. The direct-current conductor 1 is connected with the center of a primary winding 6 of a transformer 8, the ends of which are connected with the controlled valves 4 and 5. The direct-current conductor 2 is connected to the cathodes of both electric valves 4 and 5 through an inductance 3. The alternating current conductors are connected to the secondary winding 7 of the transformer 8. The commutating condenser 9 is inserted between the two electrodes supply conductors of the primary winding 6 of the transformer 8. In this connection the above described drawbacks result.

An embodiment of my invention is shown in Fig. 2. Also in this figure the parts corresponding to Fig. 1 are denoted by the same numerals of reference. However, in this case the condenser 9 is connected to the terminals of the winding 6 through non-controlled valves 15 and 16. These valves are opposing and would, therefore, not permit alone any change of charge. A change of charge is only possible if one of the controlled valves 17 or 18 cooperates therewith, which may be controlled in common, i. e., nearly at the same time with the valves 4 or 5. By the ignition of the arc in the valve 18 a charging current flows through the valve 15 and quenches the discharge in the main valve 4, so that the valve 5 operates in a corresponding manner as in the case of Fig. 2. In the connection disclosed, an auxiliary transformer 19 is connected to the terminals of the condenser 9 for improving and relieving the auxiliary valves 15, 16, 17 and 18 in order that the condenser may be charged in the desired manner. To this end, the transformer 19 is connected to the terminals of the winding 6 of the transformer 8 through an ohmic, inductive or capacitive resistance 20.

In case the controlled valves 4 and 5 have, as disclosed, reversed polarity the auxiliary valves would have to be also inserted with reversed polarity. The control voltages may be supplied by the transformer 8 in a suitable phase displacement in a well-known manner or may be controlled by the mechanical method in part, for instance, by a contact drum or by an oscillatory impulse transmitter. The direct current flowing through the conductors 1 and 2 may in case of necessity be supplied by a corresponding rectifier.

Alternating current may, however, also be directly supplied to the valves to be arranged in a multiple manner, for instance, to the valves 4 and 5 so that the described inverter is changed into a static frequency changer. If the supplied electrical power is, for instance, present in the form of three-phase current, the valves 4 and 5 may be also carried out as three or multi-anode rectifiers. Instead of the individual valves, multianode rectifiers may also be employed, if the cathodes of the valves have the same potential.

If an $m$-phase current is desired instead of the produced single-phase alternating current, the connection must also be carried out with $m$ or $2m$ phases by arranging besides the main electric valves, also the auxiliary valves at least in a $m$-fold manner. The quenching transformer, however, must not absolutely be multiplied $m$ times if the terminals thereof are, for instance, connected to each phase terminal of the winding 6 through two controllable valves connected in parallel and in opposite relation to one another.

For avoiding too high discharging surges of the quenching condenser it is advisable to insert between the terminals of the winding 6 and the valves reactors corresponding to the well-known anode reactors or to connect a reactor in series with the condenser. Resistances for damping oscillations are also used to a slight extent.

I claim as my invention:

1. An apparatus for statically converting electrical power into alternating current of any frequency having in combination a direct-current source, a transformer, a plurality of main grid-controlled arc valves, a commutating condenser interconnected between the conductors of the primary winding of said transformer so as to be impressed with frequency of the produced alternating current, noncontrolled auxiliary electric valves connected between the conductors of the primary winding of said transformer and the condenser, other grid-controlled valves connected between the direct-current source and each side of the condenser and an auxiliary transformer connected across the condenser to charge the same independently of said auxiliary valves.

2. An apparatus for statically converting electrical power into alternating current of any frequency having in combination a direct-current source, a transformer, a plurality of main grid-controlled arc valves, a commutating condenser interconnected between the conductors of the primary winding of said transformer so as to be impressed with frequency of the produced alternating current, non-controlled auxiliary electric valves connected between the conductors of the primary winding of said transformer and the condenser, other grid-controlled valves arranged between the direct-current source and the condenser, an auxiliary transformer connected across the condenser for charging the condenser independently of said auxiliary valves and connected to the first-named transformer, and a resistance inserted between said auxiliary transformer and the primary winding of the first-named transformer.

3. A vapor electric converter comprising a direct current supply line, an alternating current load line, an inductive winding associated with said alternating current line and one side of the direct current line, a plurality of controlled main valves connected between said winding and the opposite side of the direct current line, an auxiliary transformer fed by said inductive winding, a commutating capacitor charged by said transformer, a resistor in series with the primary of said transformer for controlling the charge on said capacitor and auxiliary valves for discharging said capacitor to commutate said main valves.

4. A vapor electric converter comprising a direct current supply line, an alternating current load line, an inductive winding associated with said alternating current line and one side of the direct current line, a plurality of controlled main valves connected between said winding and the opposite side of the direct current line, an auxiliary transformer fed by said inductive winding, a commutating capacitor charged by said transformer, means in series with said transformer for controlling the charge on said capacitor, oppositely connected valves between opposite sides of said capacitor and the anode leads of said main valves and controlled valves connected between opposite sides of said capacitor and the cathode side of said main valves.

5. A conversion system comprising an alternating current load system, a supply system, a transformer connected to said load system and said supply system, a plurality of controlled main valves for regulating the flow of current between said systems, an auxiliary transformer connected to said first mentioned transformer, a commutating capacitor connected to said auxiliary transformer, means in series with said auxiliary transformer for controlling the charge on said capacitor, controlled auxiliary valves connected from opposite sides of said capacitor to one side of said main valves and oppositely disposed valves for connecting said capacitor to the anode leads of said main valves.

JURGEN von ISSENDORFF.